United States Patent
Sugiyama et al.

(10) Patent No.: US 9,694,460 B2
(45) Date of Patent: Jul. 4, 2017

(54) TOOL MEASURING METHOD AND MACHINE TOOLS PROVIDED WITH MEASURING FUNCTIONS

(75) Inventors: Kousuke Sugiyama, Aiko-gun (JP); Tadashi Kimura, Aiko-gun (JP); Tadahiro Nakamura, Aiko-gun (JP)

(73) Assignee: MAKINO MILLING MACHINE CO., LTD., Meguro-ku, Tokyo (JP)

( * ) Notice: Subject to any disclaimer, the term of this patent is extended or adjusted under 35 U.S.C. 154(b) by 483 days.

(21) Appl. No.: 14/390,716

(22) PCT Filed: Apr. 6, 2012

(86) PCT No.: PCT/JP2012/059573
§ 371 (c)(1),
(2), (4) Date: Oct. 3, 2014

(87) PCT Pub. No.: WO2013/150653
PCT Pub. Date: Oct. 10, 2013

(65) Prior Publication Data
US 2015/0088454 A1   Mar. 26, 2015

(51) Int. Cl.
| | | |
|---|---|---|
| G01B 7/00 | (2006.01) | |
| B23Q 17/09 | (2006.01) | |
| G01B 5/008 | (2006.01) | |
| G01B 5/02 | (2006.01) | |
| G01B 5/012 | (2006.01) | |
| G01B 5/08 | (2006.01) | |
| B23H 9/08 | (2006.01) | |

(Continued)

(52) U.S. Cl.
CPC ........... *B23Q 17/0914* (2013.01); *B23H 9/08* (2013.01); *G01B 5/008* (2013.01); *G01B 5/012* (2013.01); *G01B 5/02* (2013.01); *G01B 5/08* (2013.01); *B23H 7/02* (2013.01); *B23H 2500/20* (2013.01)

(58) Field of Classification Search
CPC .................................................. B23Q 17/0914
See application file for complete search history.

(56) References Cited

U.S. PATENT DOCUMENTS

| | | | | |
|---|---|---|---|---|
| 8,358,424 B2* | 1/2013 | Toyoda | ............... | G01B 11/026 356/614 |
| 8,746,310 B2* | 6/2014 | Wason | ............... | B81C 1/00063 156/356 |

FOREIGN PATENT DOCUMENTS

| | | |
|---|---|---|
| JP | 59-175944 | 10/1984 |
| JP | 10-277889 | 10/1998 |

(Continued)

OTHER PUBLICATIONS

International Search Report mailed Jun. 26, 2012, directed to International Application No. PCT/JP2012/059573; 4 pages.

*Primary Examiner* — Phuong Huynh
(74) *Attorney, Agent, or Firm* — Morrison & Foerster LLP (57) ABSTRACT

When measuring the dimensions of a tool having a cutting portion at an edge of a planar portion, first a plurality of points are measured on the planar portion using a measuring probe, then a planar formula for a measurement plane containing the planar portion is determined from these measured values. Next, the measuring probe is moved along the measurement plane expressed by the planar formula from the exterior of the cutting portion toward the cutting portion until the measuring probe contacts the cutting portion. The position of the cutting portion is determined based on the position of the measuring probe when the measuring probe comes into contact with the cutting portion.

5 Claims, 6 Drawing Sheets

(51) Int. Cl.
   *G06F 11/30*      (2006.01)
   *B23H 7/02*       (2006.01)

(56)          References Cited

FOREIGN PATENT DOCUMENTS

| JP | 2005-335018 |   | 12/2005 |
|----|-------------|---|---------|
| JP | 2006-284446 |   | 10/2006 |
| JP | 2007-3205   |   | 1/2007  |
| JP | 2007003205  | * | 11/2007 |

* cited by examiner

TOOL MEASURING METHOD AND MACHINE TOOLS PROVIDED WITH MEASURING FUNCTIONS

CROSS REFERENCE TO RELATED APPLICATIONS

This application is a U.S. National Phase patent application of PCT/JP2012/059573, filed on Apr. 6, 2012, which is hereby incorporated by reference in the present disclosure in its entirety.

FIELD OF THE INVENTION

The present invention relates to a tool measurement method and to a machine tool having a measurement function for measuring an outside diameter dimension, etc., of a rotary tool.

BACKGROUND OF THE INVENTION

In the past, there has been known a measurement method which is designed to determine a tool diameter of a rotary tool, using a contact type gauge which outputs an electrical signal corresponding to an amount of displacement of a contactor (for example, see Patent Literature 1). In the method described in this Patent Literature 1, a contact type gauge is arranged near the rotary tool, the contactor is made to contact a circumferential surface of the rotary tool while making the rotary tool rotate, and the output value of the contact type gauge at this time is used as the basis to determine the tool diameter.

However, in the method described in the above Patent Literature 1, a contact type gauge which can detect an amount of displacement of the contactor is used, so an expensive sensor is necessary.

PATENT LITERATURE

Patent Literature 1: Japanese Patent Publication No. 2006-284446A

SUMMARY OF THE INVENTION

The present invention provides a tool measurement method for measuring a dimension of a tool having a flat part and an edge part at an end part of the flat part, using a contact type measurement probe, including: a measurement step of making a contactor of the measurement probe abut against a plurality of measurement points on the flat part to acquire measurement values; a plane equation derivation step of determining a plane equation of a measurement plane including the flat part, based on the measurement values obtained at the measurement step; a probe movement step of making the measurement probe move along the measurement plane represented by the plane equation determined at the plane equation derivation step from an outer side of the edge part toward the edge part until the contactor of the measurement probe abuts against the edge part; and an edge part position derivation step of determining a position of the edge part, based on a position of the measurement probe when making the contactor of the measurement probe abut against the edge part at the probe movement step.

Further, the present invention provides a machine tool having a measurement function, including: a contact type measurement probe; a movement part making the measurement probe move relative to a tool having a flat part and an edge part at an end part of the flat part; a detecting part detecting a position of the measurement probe; a plane equation calculating part calculating a plane equation of a measurement plane including the flat part, based on detection values by the detecting part when the contactor of the measurement probe abuts against a plurality of points on the flat part; a movement control part controlling the movement part so that the measurement probe moves along the measurement plane represented by the plane equation calculated by the plane equation calculating part from an outside of the edge part toward the edge part until the contactor of the measurement probe abuts against the edge part; and a position calculating part calculating a position of the edge part, based on detection values by the detecting part when making the contactor of the measurement probe abut against the edge part.

DETAILED DESCRIPTION OF THE INVENTION

Below, referring to FIG. 1 to FIG. 9, an embodiment of a machine tool having a measurement function according to the present invention will be explained. Below, the case of use of a wire electro-discharge machine as the machine tool having a measurement function will be explained, but other machine tools may also be used.

Figure 1:
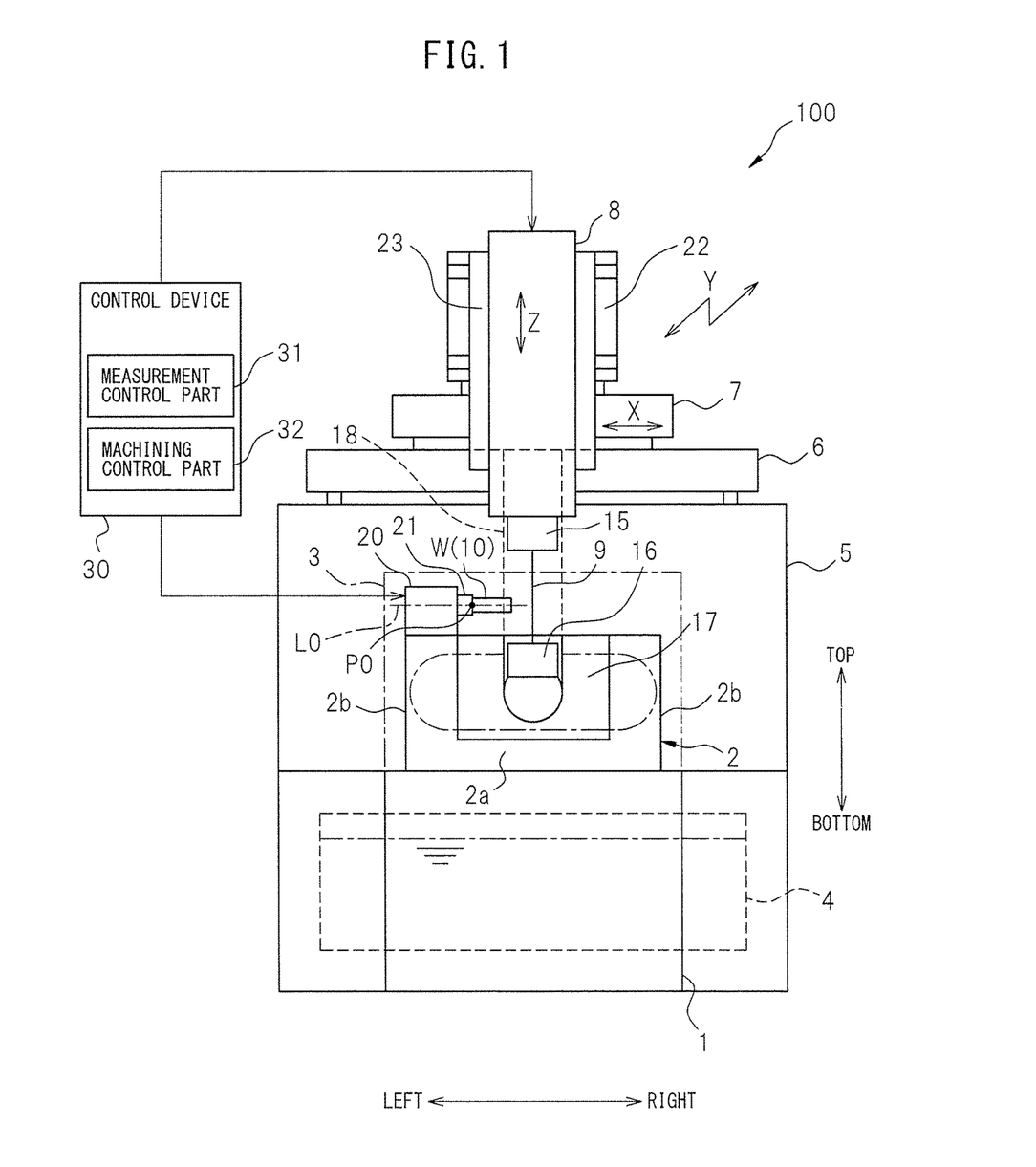
FIG. 1 is a front view of a wire electro-discharge machine as one example of a machine tool according to an embodiment of the present invention.

FIG. 1 is a front view of a wire electro-discharge machine 100 according to the present embodiment and shows a machining state of a workpiece W. Below, a "left-right direction" (X-axis direction) and "top-bottom direction" (Z-axis direction) will be defined as illustrated and a direction which is vertical to the left-right direction and vertical to the top-bottom direction (direction vertical to paper surface) will be defined as the "front-back direction" (Y-axis direction). The "front side" is the side in front of the paper surface, while the "back side" is the side behind the paper surface.

Figure 2:
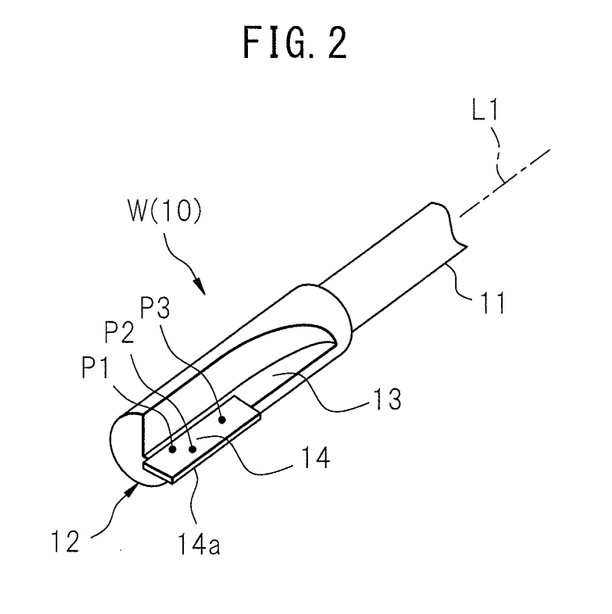
FIG. 2 is a perspective view which shows one example of a workpiece which is covered by a measurement method according to an embodiment of the present invention.

FIG. 2 is a perspective which shows one example of a workpiece W of FIG. 1. As shown in FIG. 2, the workpiece W is an end mill, reamer, or other rod-shaped rotary tool 10. This tool 10 has a substantially columnar shaped shank part 11 and a tool part 12 at a base end side and a front end side along a direction of a tool axial line L1 which is a center of rotation of the tool. At the tool part 12, a groove 13 is formed along the tool axial line L1 direction. At the machining surface of the groove 13, a PCD (polycrystalline diamond) tip or other thin plate shaped cutting blade 14 is attached by brazing, etc. The end face of the cutting blade 14 at the outside of the tool 10 in the radial direction is formed at a slant from the top surface to the bottom surface (see FIG. 4). At the end part of the top surface of the cutting blade 14, a sharp edge part 14a is formed. The edge part 14a sticks out from the front end face of the tool part 12 to the outside in the axial direction, sticks out from the outer circumferential surface of the tool part 12 to the outside in the radial direction, and defines an outermost part of the tool 10.

Figure 3:
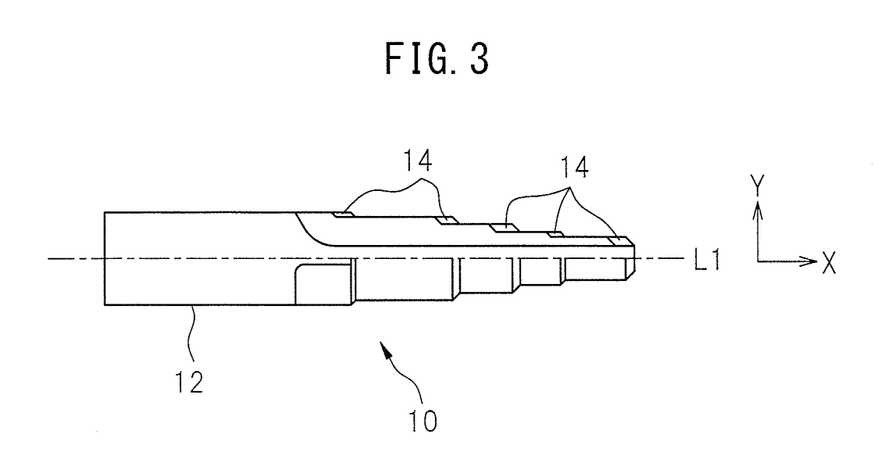
FIG. 3 is a view which shows a modification of FIG. 2.

In the figures, a cutting blade 14 is provided at one location in the circumferential direction (one blade), but it is also possible to provide a plurality of cutting blades 14 symmetrically in the circumferential direction. For example, it is possible to provide two (two blades) every 180 degrees in the circumferential direction, three (three blades) every 120 degrees, four (four blades) every 90 degrees, or other pluralities of cutting blades 14 to form the rotary tool 10. Further, as shown in FIG. 3, the tool part 12 may be made a stepped shape which becomes narrower the further toward the front end part in the axial direction and a plurality of cutting blades 14 may be provided separated from each other in the axial direction.

As shown in FIG. 1, at a top part of a bed 1, a workpiece mounting table 2 is supported. The workpiece mounting table 2 has a left-right pair of side wall parts 2b which extend upward from a base part 2a. On the top surface of one of the side wall parts 2b, a rotation and indexing device 20 is provided. At the rotation and indexing device 20, a chuck 21 is provided so as to hold the workpiece W along the horizontal axial line L0 which is parallel to the X-axis. At the chuck 21, the shank part 11 of the tool 10 is attached in a state that the axial of rotation L1 of the tool 10 (FIG. 2) and the axial line L0 are matched. The chuck 21 is, for example, driven to rotate about the axial line L0 by a servo motor inside of the rotation and indexing device. Due to this, it is possible to index and position the tool 10 about the horizontal axial line which is parallel to the X-axis (below, "about the C-axis").

On the bed 1, a machining tank 3 is provided so as to surround the workpiece mounting table 2 and the rotation and indexing device 20. Inside the bed 1 below the machining tank 3, a machining fluid tank 4 is housed. For the machining fluid, water or oil is used.

At the rear of the workpiece mounting table 2, a column 5 is provided standing up. At the top part of the column 5, a Y-axis slider 6 is supported through a linear feed mechanism slidably in the Y-axis direction (front-back direction). On the Y-axis slider 6, an X-axis slider 7 is supported through a linear feed mechanism slidably in the X-axis direction (left-right direction). On the X-axis slider 7, a V-axis slider 22 is supported through a linear feed mechanism movably in a V-axis direction which is parallel to the Y-axis. At the front surface of the V-axis slider 22, a U-axis slider 23 is supported through a linear feed mechanism movably in a U-axis direction which is parallel to the X-axis. At the front surface of the U-axis slider 23, a quill 8 is supported through the linear feed mechanism to be able to ascend and descend in the Z-axial direction (top-bottom direction). The X-axis, Y-axis, Z-axis, U-axis, and V-axis linear feed mechanisms are, for example, comprised of ball screws and servo motors, etc. which drive to rotate the ball screws.

At a bottom end of the quill 8, a top head 15 is attached. Below the top head 15, i.e., in an inside recessed space 17 of the pair of left-right side wall parts 2b, a bottom head 16 is arranged. Between the top head 15 and the bottom head 16, a wire electrode 9 extends in the vertical direction. The wire electrode 9 is supported by the top and bottom heads 15 and 16. The wire electrode 9 is fed by a not shown feeding means between the top head 15 and the bottom head 16.

At the X-axis slider 7, a support arm 18 is integrally attached. The support arm 18 is extended from the back of the workpiece mounting table 2 to the inside of the recessed space 17. The bottom head 16 is supported at the front end part of the support arm 18 and is coupled through the support arm 18 integrally with the X-axis slider 7.

Due to this, the top head 15 and the bottom head 16 can move integrally in the front-back and left-right directions. The wire electrode 9 moves relative to the workpiece W in the two perpendicular axes of the X-axis and Y-axis directions while maintaining the vertical posture. Further, using the U-axis slider 23 and a V-axis slider 22, the top head 15 can move relative to the bottom head 16 in the front-back and the left-right directions. The wire electrode 9 can be made to incline with respect to the vertical line by a desired angle. The top head 15 can also move in the Z-axis direction by the ascending and descending operation of the quill 8.

When machining the workpiece, machining fluid is supplied through a not shown pump from a machining fluid tank 4 to the inside of the machining tank 3. Furthermore, the wire electrode 9 is arranged separated from the workpiece W by a slight interval. Between the wire electrode 9 and the workpiece W, a pulse voltage is applied from a machining use power source. Due to this, electro-discharge occurs between the workpiece W and the wire electrode 9, whereby the workpiece W is machined.

The above feed mechanisms have position detectors which detect the positions of the axes. Using the signals from these position detectors, it is possible to detect the amounts of movement from the initial positions of the top head 15 and the bottom head 16 and the amount of rotation from the initial position of the workpiece W. Due to this, it is possible to determine the position of a reference point on the axial line L2 (FIG. 4) which passes through the center of the wire electrode 9 (for example, a point P1 of the bottom end part of the top head 15) with respect to the origin P0 of the X-, Y-, and Z-coordinate system (machine coordinate system). The reference point P1 is a point serving as a reference at the time of machining the workpiece and can be set to another position on the axial line L2. The origin P0 is, for example, set on the end face of the chuck 21 on the axial line L0.

The operation of the wire electro-discharge machine, i.e., the drives of the X-axis, Y-axis, Z-axis, U-axis, and V-axis use servo motors and C-axis use servo motor, etc., is controlled by the control device 30 of FIG. 1. The control device 30 is configured including a CPU, ROM, RAM, and other peripheral circuits, etc. and has a measurement control part 31 which controls the operation at the time of workpiece measurement and a machining control part 32 which controls the operation at the time of workpiece machining.

The measurement control part 31 controls the operation of a measurement probe 34 (FIG. 4) which is integrally attached to the top head 15 and uses a signal from the measurement probe 34 as the basis to measure a dimension of the cutting blade 14 before machining and after machining. The machining control part 32 outputs a control signal to the servo motors in accordance with a predetermined machining program and makes the wire electrode 9 move relative to the workpiece W so as to machine the edge part 14a of the cutting blade 14 to the desired shape.

Figure 4:
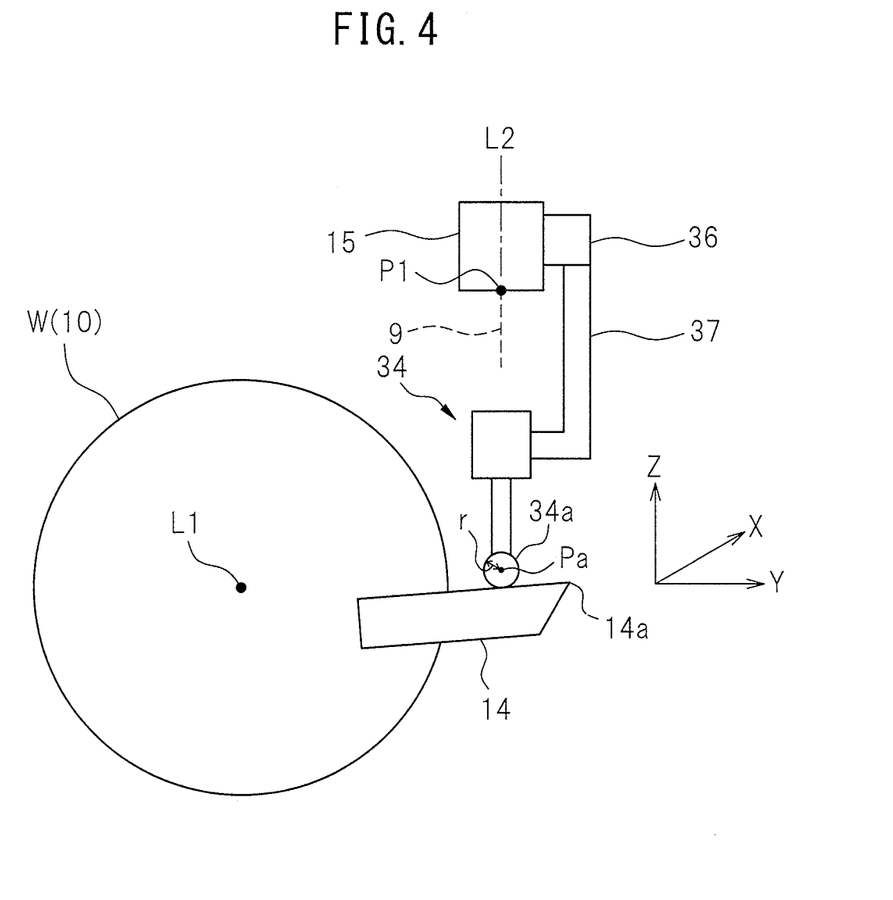
FIG. 4 is a view which shows an example of attachment of a measurement probe to the wire electro-discharge machine of FIG. 1.

FIG. 4 is a view which shows an example of attachment of the measurement probe 34. As shown in FIG. 4, at a side face of the top head 15, a base member 36 is attached. At the base member 36, a base end part of a support arm 37 is fastened. At a front end part of the support arm 37, a measurement probe 34 is supported facing the vertical direction.

The measurement probe 34 has a spherical shaped contactor 34a at the front end part (bottom end part). At the time of measurement of the workpiece, the wire electrode 9 is retracted from near the workpiece, then the measurement probe 34 is arranged so that the center point Pa of the contactor 34a is positioned below the top head 15 and substantially on the axial line L2 of the wire electrode 9. The offset coordinates (ΔX, ΔY, ΔZ) of the center point Pa with respect to the reference point P1 of the bottom end part of the top head 15, i.e., the amounts of deviation from P1 to Pa in the X-axis direction, Y-axis direction, and Z-axis direction, and the radius r of the contactor 34a are actually measured in advance and are stored in the memory.

The measurement probe 34 is provided integrally with the top head 15, so it is possible to drive the X-axis use, Y-axis use, and Z-axis use servo motors so as to move the measurement probe 34 to the position of any measurement point on the workpiece surface. The measurement probe 34 outputs an ON signal when the contactor 34a abuts against the workpiece surface and outputs an OFF signal when it separates from the workpiece surface. The signals from position detectors which are provided at the X-axis use, Y-axis use, and Z-axis use feed mechanisms at the time of output of the ON signal can be used to detect the position (X-, Y-, and Z-coordinates) of the center point Pa of the contactor 34a which abuts against the surface of the workpiece W.

The rotary tool 10 which is machined by such a wire electro-discharge machine 100, for example, is attached to a spindle of a machining center and machines a workpiece which is fastened on a table. In this case, in order to precisely machine the workpiece on the table, the outside most diameter of the tool 10, i.e., the distance Ra from the center of rotation L1 of the tool 10 to the edge part 14a (FIG. 5) needs to be grasped. In the present embodiment, the wire electro-discharge machine 100 of FIG. 1 is used in the following way to measure a dimension of the edge part 14a (outside diameter dimension Ra of tool 10).

(1) Adjustment of Initial Angle

Figure 5:
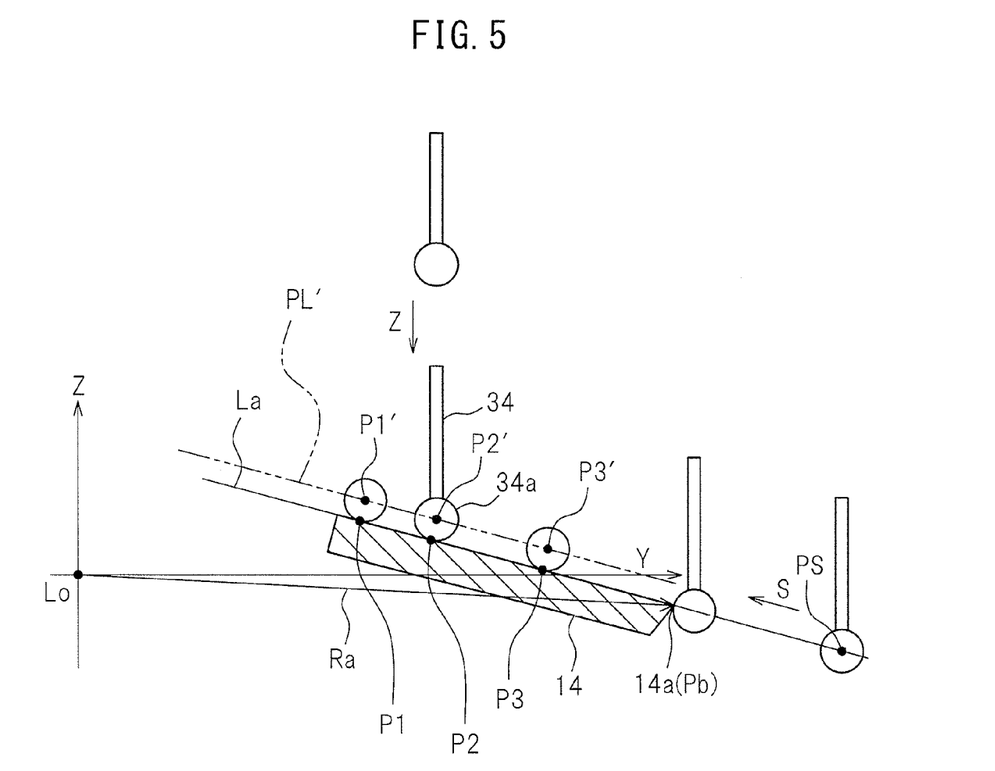
FIG. 5 is a view which explains a measurement step of a workpiece dimension.

First, as shown in the YZ-cross-sectional view of the cutting blade 14 of FIG. 5, the workpiece W is rotated about the C-axis to adjust the initial angle of the workpiece W about the C-axis so that the position of a measurement point on the workpiece surface, i.e., the position of the edge part 14a, becomes substantially the same height as the axial line L0 of the rotation and indexing device. In this adjustment work, there is no need to make the position of the edge part 14a strictly match with the height of the axial line L0.

(2) Measurement of Offset Coordinates and Contactor Radius

Furthermore, a link gauge or other master workpiece is used to measure the offset coordinates (ΔX, ΔY, ΔZ) of the center point Pa (FIG. 4) of the contactor 34a and the radius r of the contactor 34a. When the radius r is known in advance, the measurement of the radius r may be omitted.

(3) Three-Point Measurement of Top Surface of Cutting Edge

In order to determine a plane equation of the top surface of the cutting blade 14, the measurement probe 34 is used to measure three points on the top surface of the cutting blade 14. In this case, the three points P1, P2, and P3 on the cutting blade 14 which is shown in FIG. 2 are used as measurement points, and the measurement probe 34 is made to successively abut against these measurement points P1, P2, and P3 so as to acquire three points' worth of measurement values.

Specifically, the X- and Y-coordinates of the measurement points P1, P2, and P3 not on one line are set in advance, and the measurement probe 34 is moved to those X- and Y-coordinates above the cutting blade 14. Next, the measurement probe 34 is made to descend toward the measurement points P1, P2, and P3, as shown by the arrow Z of FIG. 5 until the measurement probe 34 abuts against the measurement points P1, P2, and P3 and ON signals are output. The center points Pa of the contactor 34a when the measurement probe 34 abuts against the measurement points P1, P2, and P3 are made P1', P2', and P3'. The signals from the position detectors at the time of output of the ON signals can be used to determine the positions (X-, Y-, and Z-coordinates) of the center points P1', P2', and P3'. That is, the position (X1, Y1, and Z1) of the center point P1', the position (X2, Y2, and Z2) of the center point P2', and the position (X3, Y3, and Z3) of the center point P3' can be determined.

(4) Calculation of Plane Equation of Top Surface of Cutting Blade

Figure 6:
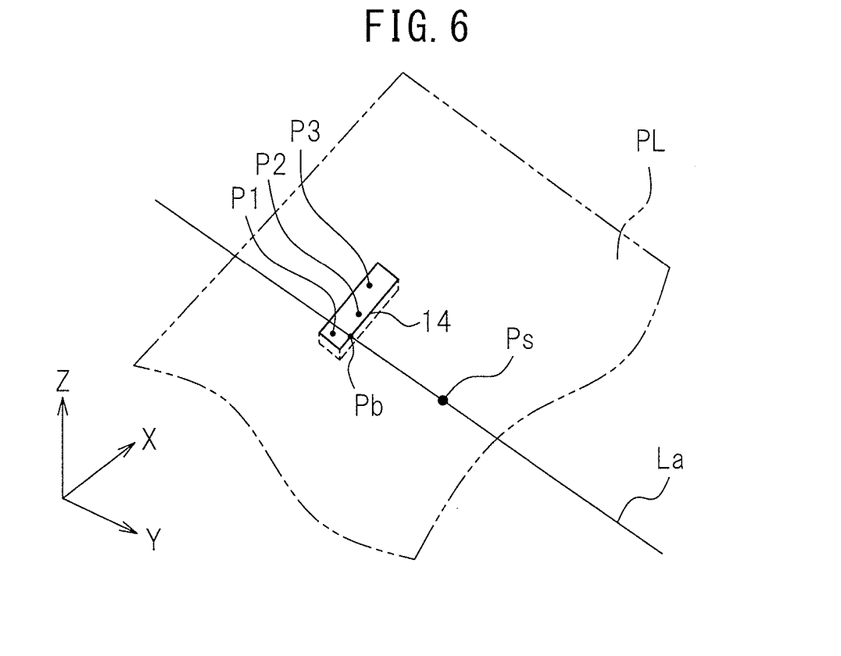
FIG. 6 is a view which shows a measurement plane determined by three-point measurement as one step of the measurement method according to the present embodiment.

Next, the formula of the measurement plane PL which includes the top surface of the cutting blade 14 such as shown in FIG. 6, i.e., the plane equation which is represented by the next formula (I), is calculated:

$$AX+BY+CZ+D=0 \tag{I}$$

Figure 7:
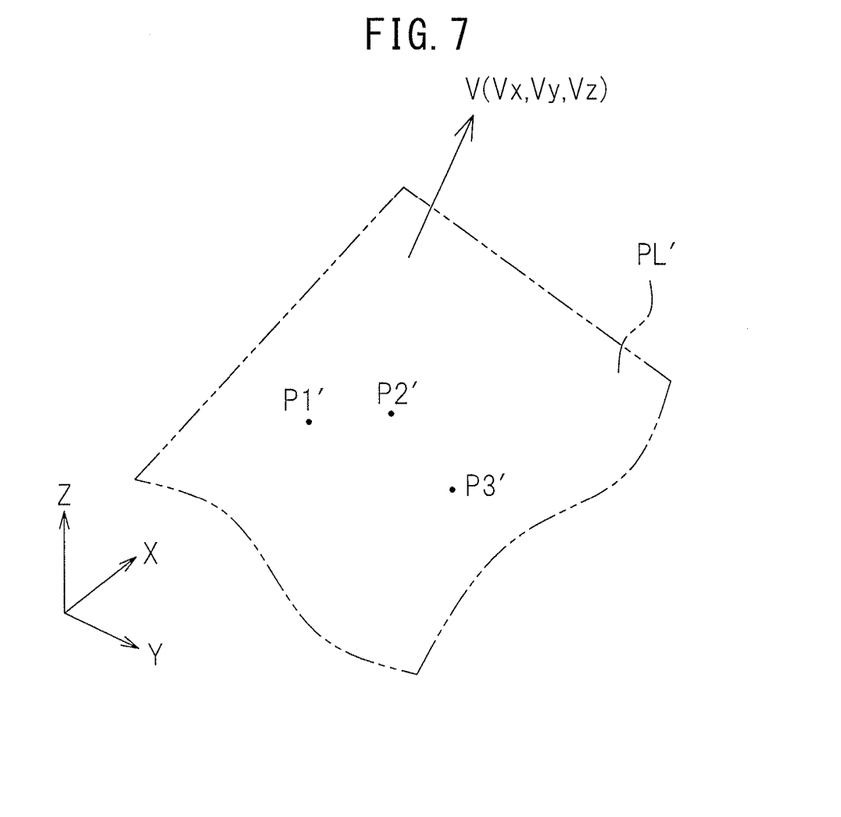
FIG. 7 is a view which shows an imaginary plane which passes through a plurality of center points of the contactor.

In this case, first, the measurement position coordinates of the center points P1', P2', and P3' are used as shown in FIG. 7 to calculate the plane equation of the imaginary plane PL' of the 3D space passing through the center points P1', P2', and P3' by the next formula (II).

$$AX+BY+CZ+D'=0$$

$$\text{where, } A^2+B^2+C^2=1 \text{ and } C>0 \tag{II}$$

The measurement plane PL which includes the top surface of the cutting blade 14 and the imaginary plane PL' are parallel, so the calculated X-, Y-, and Z-components of the unit normal vector become the constants A, B, and C of the above formula (I).

Furthermore, the measurement position coordinates (for example, X1, Y1, and Z1) of the center point Pa of the contactor 34a are entered for the variables X, Y, and Z of the plane equation of the imaginary plane PL' which is represented by the above formula (II) to calculate the constant D'. At this time, the absolute value of D' corresponds to the distance from the origin of the mechanical coordinate system to the imaginary plane PL'. The distance between the measurement plane PL and the imaginary plane PL' is equal to the radius r of the contactor 34a, so by adding r to the distance D', it is possible to determine the distance from the origin to the measurement plane PL, i.e., the constant D of the above formula (I).

(5) Movement of Contactor to Measurement Start Position

As shown in FIG. 6, a point of the edge part 14a for determining the outside diameter dimension of the tool 10 is made the measurement point Pb. If making the X-coordinate of this measurement point Pb "E", the formula of the line La which is present on the measurement plane PL which passes through the measurement point Pb and is parallel to the YZ plane can be determined by entering X=E in the above formula (I). When measuring the outer circumference dimension of the cutting blade 14, first, the center point Pa of the contactor 34*a* is moved to the measurement start position Ps and the center point Pa of the contactor 34*a* is made to move from there along the line La.

The measurement start position Ps is set in advance at a position which is separated from the axial line L0 in the Y-direction by a predetermined amount F. The predetermined amount F is set at the value (R0+β) larger than the design value R0 of the tool radius by a predetermined amount β. If using the constants A to F and ΔX, ΔY, and ΔZ, the X-, Y-, and Z-coordinates (Xs, Ys, Zs) of the reference point P1 when the center point Pa of the contactor 34*a* is at the measurement start position Ps are expressed by the next formula (III).

$$(Xs, Ys, Zs) = (E - \Delta X, F - \Delta Y, -(AE + BF + D)/C - \Delta Z) \quad (III)$$

When making the center point Pa of the contactor 34*a* move to the measurement start position Ps of the above formula (III), first, it is made to move to a first position (Xs, Ys, Zs+γ) which is above the measurement start position Pa by a predetermined amount γ at a predetermined speed v1. The predetermined amount γ is, for example, a value larger than the design value R0 of the tool radius. Next, the measurement probe 34 is made to descend at a predetermined speed v2 from the first position by a predetermined amount γ so as to make the center point Pa of the contactor 34*a* move to the measurement start position Ps (second position). The speed v2 is a lower speed than the speed v1. Due to this, in the middle of movement of the contactor 34*a* to the measurement start position Ps, it is possible to prevent the contactor 34*a* from contacting the tool 10 at a high speed.

(6) Approach of Contactor to Measurement Location

Next, as shown in FIG. 5 by the arrow mark S, the measurement probe 34 is made to move from the measurement start position Ps at the outside of the tool 10 in the radial direction toward an inside measurement point Pb along the line La. Y- and Z-direction movement commands of the measurement probe 34 are, for example, given by incremental commands. The vector S in the movement direction of the measurement probe 34 is expressed by the next formula (IV).

$$S = (0, -F, F \times B/C) \quad (IV)$$

If the contactor 34*a* abuts against the edge part 14*a* and outputs an ON signal, movement of the measurement probe 34 is stopped.

(7) Calculation of Outside Diameter Dimension

Figure 8:
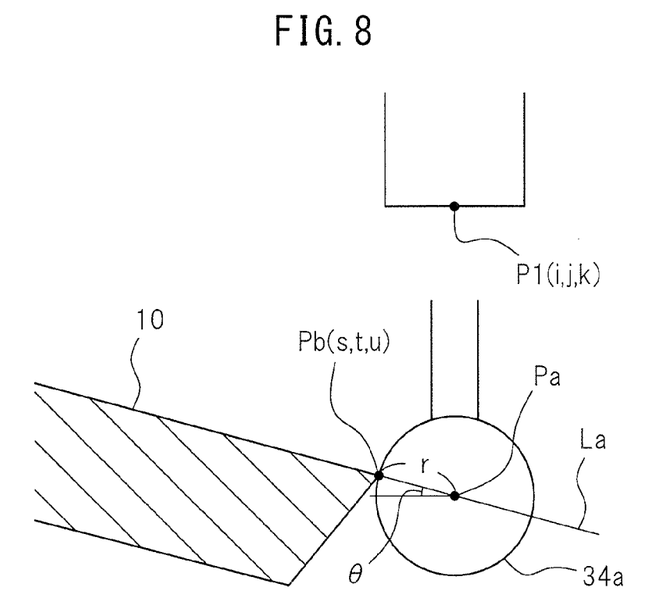
FIG. 8 is an enlarged view when making the contactor move to a measurement point.

Based on the signal from the position detector when the measurement probe 34 outputs an ON signal, as shown in FIG. 8, it is possible to determine the position coordinates (i, j, k) of the reference point P1 of the mechanical coordinate system. This position coordinates (i, j, k) can be used by the next formula (V) to calculate the position coordinates (s, t, u) of the measurement point Pb.

$$Pb = (s, t, u) = (i - \Delta X, j - r \times \cos\theta - \Delta Y, k - r \times \sin\theta - \Delta Z) \quad (V)$$

where, tan θ=−B/C. Therefore, the outside diameter dimension Ra of the tool 10 which is determined by the position of the edge part 14*a* can be determined by the next formula (VI) using the t and u of the above formula (V).

$$Ra = (t^2 + u^2)^{1/2} \quad (VI)$$

According to the above method, the center Pa of the contactor 34 of the measurement probe 34 moves from the outside of the tool 10 toward the edge part 14*a* on the same plane as the top surface of the cutting blade. Therefore, it is possible to make the contactor 34 precisely abut against the edge part 14*a* whereby the precision of measurement of the position of the edge part 14*a* is improved.

Among the steps of the above (1) to (7), for example, the steps of (3) to (7) can be automatically performed by processing at the measurement control part 31 of the control device 30 (FIG. 1).

Figure 9:
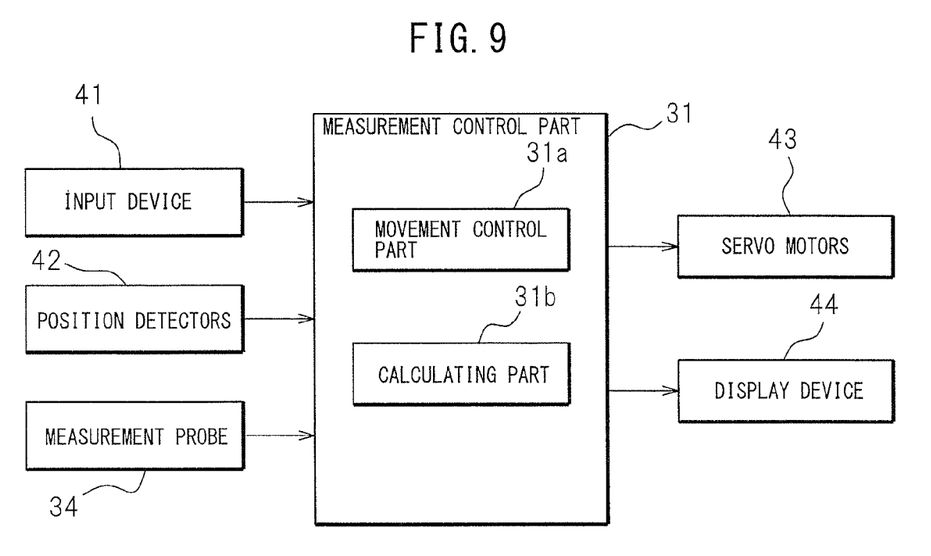
FIG. 9 is a block diagram which shows part of a control configuration of the wire electro-discharge machine of FIG. 1.

FIG. 9 is a block diagram which shows the control configuration relating to measurement of a workpiece dimension of a wire electro-discharge machine according to the present embodiment. The measurement control part 31 receives as input signals from an input device 41, position detectors 42 which are provided at the XYZ-axis use feed mechanism, and the measurement probe 34. The measurement control part 31 has a movement control part 31*a* which controls movement of the servo motors 43 and a calculating part 31*b* which performs calculations on the above-mentioned plane equation or the dimension of the outer circumferential edge, etc. The results of calculation by the calculating part 31*b* are output to the display device 44.

The input device 41 is, for example, configured by a touch panel or other input monitor which is operated by a user. The information which is input by the input device 41 includes the offset coordinates (ΔX, ΔY, ΔZ) of the contactor 34*a* of the measurement probe 34, the radius r, the constants R0, β, and γ for setting the measurement start position Ps, the X- and Y-coordinates of the measurement points P1, P2, and P3 of the top surface of the cutting blade, the X-coordinate E when determining the dimension of the outer circumference edge, and the measurement start command, etc.

The movement control part 31*a* controls the servo motor 43 so that the contactor 34*a* of the measurement probe 34 abuts against the measurement points P1, P2, and P3 of the top surface of the cutting blade if a measurement start command is input. Due to this, the X-, Y-, and Z-coordinates of the center points P1', P2', and P3' of the contactor 34*a* which correspond to the measurement points P1, P2, and P3 are acquired. The calculating part 31*b* calculates the normal vector V and unit normal vector of the imaginary plane PL' which passes through these three points and calculates the plane equation (I) of the measurement plane PL which passes through the top surface of the cutting blade. Furthermore, the formula of the line La of the fixed X-coordinate which passes over the measurement plane PL and passes through the measurement point Pb for determining the outside diameter dimension is calculated.

Next, the movement control part 31*a* makes the center point Pa of the contactor 34*a* move to a measurement start position Ps on the line La which is expressed by the above formula (III). Further, it controls the servo motors 43 so that the center point Pa of the contactor 34*a* moves along the line La from the measurement start point Ps toward the measurement point Pb at the end part of the top surface of the cutting blade. The Y- and Z-direction movement commands of the contactor 34*a* are given by incremental commands. The direction of the contactor 34*a* in this case is expressed by the vector S of the above formula (IV).

The calculating part 31*b* uses the position of the contactor 34*a* when the contactor 34*a* abuts against the measurement point Pb as the basis to calculate the dimension of the outer circumference edge Ra of the edge part 14*a*. More specifically, the position coordinates (i, j, k) of the reference point P1, the offset amounts ΔX, ΔY, and ΔZ of the reference point P1 and the center point Pa of the contactor 34*a*, and the inclination θ of the measurement plane PL are used as the basis to calculate the position coordinates (s, t, u) of the measurement points Pb by the above formula (V). Furthermore, the above formula (VI) is used to calculate the outside diameter dimension Ra of the tool 10 and the outside diameter dimension Ra is made to be displayed at the display part 44 (touch panel of input device 41, etc.)

If the edge part 14a is parallel to the axial line L0, the dimension of the outer circumference edge of the edge part 14a (tool outside diameter) is constant along the axial line L0. For this reason, as explained above, by determining the coordinates of a single measurement point Pb, it is possible to determine the outside diameter dimension of the tool 10 across the edge part 14a as a whole. On the other hand, if the edge part 14a is slanted with respect to the axial line L0, it is possible to determine the coordinates of two measurement points Pb and connect the two points by a line so as to determine the outside diameter dimension of the tool 10.

According to the present embodiment, the following actions and effects can be exhibited:

(1) The measurement probe 34 is made to abut against three measurement points P1, P2, and P3 on the cutting blade to obtain the positions of the center points P1', P2', and P3' of the contactor 34a corresponding to the positions of these measurement points, i.e., the positions of the center points P1', P2', and P3' separated from the measurement points P1, P2, and P3 by the predetermined distance r (measurement step). Further, a plane equation of the measurement plane PL of the top surface of the cutting blade which is parallel to an imaginary plane PL' which passes through the center points P1', P2', and P3' is determined (plane equation derivation step). Furthermore, the line La on the measurement plane PL is used as the movement path of the measurement probe 34 to make the measurement probe 34 move along the line La from the outside of the edge part 14a toward the edge part 14a so as to make the measurement probe 34 abut against the edge part 14a (probe movement step). The position of the measurement probe 34 when this measurement probe 34 abuts against the edge part 14a is used as the basis to determine the position of the edge part 14a (edge part position derivation step). Due to this, even when the position (height) of the edge part 14a is off from the axial line L0, the center point Pa of the measurement probe 34 can be positioned on the same plane as the top surface of the cutting blade and made to abut against the edge part 14a. Therefore, the measurement probe 34 can be used to precisely measure the outside diameter of the tool 10.

(2) The measurement probe 34 which outputs an ON and OFF signal in accordance with contact and non-contact with the workpiece W is used to measure the outside diameter dimension of the tool 10, so it is possible inexpensively configure a wire electro-discharge machine having a workpiece measurement function.

(3) When making the measurement probe 34 abut against the workpiece W, it is not necessary to make the workpiece W rotate. Therefore, it is possible to quickly measure the outside diameter dimension of the tool 10.

(4) Processing at the measurement control part 31 is used to automatically move the measurement probe 34 to the measurement points P1, P2, and P3 of the top surface of the cutting blade, move the measurement probe 14 to the measurement point Pb of the edge part 14a, calculate the plane equation of the top surface of the cutting blade, calculate the movement path (line La) of the measurement probe 34 from the measurement start point P2 at the outside of the edge part 14a toward the measurement point Pb, calculate the dimension of the outer circumference edge of the tool 10, etc. Therefore, the workpiece dimensions can be measured easily and accurately.

In the above embodiment, the X-, Y-, and Z-axis use servo motors 43 are used to move the measurement probe 34, but the movement part is not limited to this configuration. The measurement probe 34 is made to abut against the three measurement points P1, P2, and P3 of the top surface of the cutting blade to calculate the plane equation of the measurement plane PL, but when the top surface of the cutting blade is parallel with the axial line L0, it is possible to calculate the plane equation by measuring the positions of the top surface of the cutting blade at two different points in the radial direction. The positions of the center points P1', P2', and P3' of the contactor 34a when making the contactor 34a abut against a plurality of measurement points P1, P2, and P3 are obtained as measurement values, and the imaginary plane PL' obtained by this measurement value is used as the basis to calculate the plane equation of the measurement plane PL parallel to the imaginary plane PL', but the calculation step of the plane equation is not limited to this. For example, it is also possible to obtain the positions of the center point Pa of the contactor 34a when making the contactor 34a abut against a plurality of measurement points P1, P2, and P3 as the measurement values, and directly determine the plane equation of the measurement plane PL. Therefore, the plane equation calculating part constituted by the calculating part 31b is not limited to the above-mentioned configuration.

So long as making the measurement probe 34 move along the measurement plane PL which is defined by the calculated plane equation from the outside of the edge part 14a toward the edge part 14a, the movement control part 31a is not limited to the above-mentioned configuration. So long as using the position detection values when making the measurement probe 34 abut against the edge part 14a (measurement point Pb) so as to calculate the position of the edge part 14a, the position calculating part constituted by the calculating part 31b is also not limited to the above-mentioned configuration.

In the above embodiment, a measurement method of a rotary tool 10 which has an edge part 14a at an end part of a cutting blade 14 of a flat shape plate member is explained, but the present invention can be applied to not only a tool which has a cutting blade 14 or not only a rotary tool, but any other tool so long as having an edge part at an end part of a flat part. Further, the present invention can be similarly applied to a machining center or other machine tool other than a wire electro-discharge machine.

According to the present invention, it is possible to use a measurement probe which outputs an ON and OFF signal in accordance with a contact and non-contact state so as to precisely measure a dimension of a tool which has an edge part at an end part of a flat part and it is possible to inexpensively configure a machine tool having a measurement function.

REFERENCE SIGNS LIST 10 tool
14 cutting blade
14a edge part
31 measurement control part
31a movement control part
31b calculating part
34 measurement probe
42 position detector
43 servo motor
100 wire electro-discharge machine P1 to P3, Pa measurement points
PL measurement plane

The invention claimed is:

1. A tool measurement method for measuring a dimension of a tool having a flat part and an edge part at an end part of the flat part, using a contact type measurement probe, comprising:
- a measurement step of making a contactor of the measurement probe abut against a plurality of measurement points on the flat part to acquire measurement values;
- a plane equation derivation step of determining a plane equation of a measurement plane including the flat part, based on the measurement values obtained at the measurement step;
- a probe movement step of making the measurement probe move along the measurement plane represented by the plane equation determined at the plane equation derivation step from an outer side of the edge part toward the edge part until the contactor of the measurement probe abuts against the edge part; and
- an edge part position derivation step of determining a position of the edge part, based on a position of the measurement probe when making the contactor of the measurement probe abut against the edge part at the probe movement step.

2. The tool measurement method of claim 1, wherein
the measurement step includes measuring the positions of center points of the contactor at the plurality of measurement points, and
the plane equation derivation step includes, based on an imaginary plane passing through the plurality of center points of the contactors, determining a plane equation of the measurement plane parallel to the imaginary plane.

3. The tool measurement method of claim 1, wherein
the tool is a rotary tool including a groove part and a flat shaped plate member having the edge part and attached in the groove part, and
the edge part position derivation step includes determining an outside diameter of the edge part based on the position of the measurement probe when making the contactor of the measurement probe abut against the edge part.

4. The tool measurement method of claim 1, wherein
the probe movement step includes making the contactor of the measurement probe abut against two different points of the edge part, and
the edge part position derivation step includes determining the position of the edge part based on the positions of the measurement probe.

5. A machine tool having a measurement function, comprising:
- a contact type measurement probe;
- a movement part making the measurement probe move relative to a tool having a flat part and an edge part at an end part of the flat part;
- a detecting part detecting a position of the measurement probe;
- a plane equation calculating part calculating a plane equation of a measurement plane including the flat part, based on detection values by the detecting part when the contactor of the measurement probe abuts against a plurality of points on the flat part;
- a movement control part controlling the movement part so that the measurement probe moves along the measurement plane represented by the plane equation calculated by the plane equation calculating part from an outside of the edge part toward the edge part until the contactor of the measurement probe abuts against the edge part; and
- a position calculating part calculating a position of the edge part, based on detection values by the detecting part when making the contactor of the measurement probe abut against the edge part.

* * * * *